United States Patent [19]

Nagai et al.

[11] Patent Number: 5,202,202
[45] Date of Patent: Apr. 13, 1993

[54] CELL COMPRISING POLYANILINE POSITIVE ELECTRODE AND METHOD FOR PRODUCING POLYANILINE POWDER THEREFOR

[75] Inventors: Ryo Nagai, Hirakata; Hiroshi Hattori, Suita; Hiroyuki Higuchi, Takatsuki; Masao Abe, Kyoto, all of Japan

[73] Assignees: Hitachi Maxell, Ltd.; Nitto Denko Corporation, both of Ibaraka, Japan

[21] Appl. No.: 541,743

[22] Filed: Jun. 21, 1990

[30] Foreign Application Priority Data

Jun. 23, 1989 [JP] Japan .................................. 1-161120
Jul. 12, 1989 [JP] Japan .................................. 1-179956

[51] Int. Cl.[5] .............................................. H01M 4/60
[52] U.S. Cl. ..................................... 429/193; 429/194
[58] Field of Search ................................ 429/193, 194

[56] References Cited

U.S. PATENT DOCUMENTS

4,556,623 12/1985 Tamura et al. .
4,615,829 10/1986 Tamura et al. .
4,869,979 9/1989 Ohtani et al. .
4,904,553 2/1990 Nakajima et al. .................... 429/213
4,906,538 3/1990 Toyosawa ............................ 429/197
4,940,640 7/1990 MacDiarmid ....................... 429/213

FOREIGN PATENT DOCUMENTS

0198484 4/1986 European Pat. Off. .

Primary Examiner—Olik Chaudhuri
Assistant Examiner—M. Nuzzolillo

[57] ABSTRACT

A cell comprising a negative electrode made of metal lithium or a lithium alloy, a positive electrode which comprises polyaniline and has a main peak around 3.0 V versus a lithium electrode and a sub-peak around 3.6 V versus a lithium electrode with a height ratio of the sub-peak to the main peak being not smaller than 0.25 in a discharge capacity distribution curve in the discharge voltage range between 3.8 V and 2.5 V versus a lithium electrode, and a non-aqueous organic electrolytic solution containing a lithium salt dissolved therein, which has long discharge life, high energy density, good charge-discharge cycle characteristics and improve load characteristics.

7 Claims, 9 Drawing Sheets

CELL COMPRISING POLYANILINE POSITIVE ELECTRODE AND METHOD FOR PRODUCING POLYANILINE POWDER THEREFOR

BACKGROUND OF THE INVENTION

1. Field of the Invention

The present invetnion relates to a cell which comprises a negative electrode made of lithium or a lithium alloy, a positive electrode comprising polyaniline and a non-aqueous electrolytic solution comprising a lithium salt, and a method for producing polyaniline powder to be used for the fabrication of said positive electrode.

2. Description of the Related Art

Since polyaniline exhibits electrical conductivity through ion doping, a polyaniline cell uses electrode potential change due to change of an amount of ion doping in a conductor region comprising polyaniline as an active material. The polyaniline cell can be used as a secondary cell.

Polyaniline can be synthesized mainly by two polymerization methods, one of which is electrolytic oxidative polymerization comprising electrochemical oxidative polymerization of aniline monomer and the other of which is chemical oxidative polymerization. As the positive electrode material of the polyaniline cell, polyaniline a primary particles of which are of fibrous shape and which is synthesized by the electrolytic oxidative polymerization is preferable in view of cell performance such as capacity.

The polyaniline having the fibrous primary particle shape is prepared by controlling polymerization conditions such as temperature, voltage, current or monomer concentration so that the primary particles become fibrous when a voltage is applied between a pair of electrodes which are dipped in an acidic aqueous solution of aniline or its derivative to deposit polyaniline on one of the electrodes (cf. for example, Preprint for the 24th Cell Forum (1983) 197). Since the polyaniline having the fibrous primary particle shape has good electrical conductivity among the particles due to their shape, the cell comprising the positive electrode made of such polyaniline advantageously has small polarization and a large capacity.

In connection with the chemical oxidative polymerization, various proposals have been made to provide polyaniline which is suitable as the positive electrode material of the cell (cf. Japanese Patent Kokai Publication Nos. 200669/1986, 81420/1987 and 181334/1987).

In the cell comprising the positive electrode made of the polyaniline which has the fibrous primary particle shape and is synthesized by the electrolytic oxidative polymerization, since the polyaniline is crosslinked, crosslinked sites do not contribute to the doping reaction so that a utilization factor of the positive electrode is decreased, discharge life is shortened, and an energy density and load characteristics are insufficient.

The cell having the positive electrode which is made of polyaniline synthesized by the chemical oxidative polymerization does not have satisfactory properties such as discharge life, energy density, load characteristics and the like.

SUMMARY OF THE INVENTION

One object of the present invention is to provide a cell which comprises a positive electrode made of polyaniline and has long discharge life, high energy density, good cycle characteristics and improved load characteristics.

Another object of the present invention is to provide a method for producing polyaniline which is suitable for the fabrication of a positive electrode of a cell.

In the first aspect of the present invention, there is provided a cell comprising a negative electrode made of metal lithium or a lithium alloy, a positive electrode which comprises polyaniline and has a main peak around 3.0 V versus a lithium electrode and a sub-peak around 3.6 V versus a lithium electrode with a height ratio of the sub-peak to the main peak being not smaller than 0.25 in a discharge capacity distribution curve in the discharge voltage range between 3.8 V and 2.5 V versus a lithium electrode, and a non-aqueous organic electrolytic solution containing a lithium salt dissolved therein.

In the second aspect of the present invention, there is provided a method for producing polyaniline powder particles of which are of rod-like shape and have an average diameter of 0.01 to 1.0 μm and an average length of 0.1 to 10 μm, which method comprises chemically oxidative polymerizing aniline with manganese dioxide in the presence of a protonic acid at a molar ratio of the protonic acid to manganese dioxide of at least 2.5 at a temperature of −5° to 10° C.

The polyaniline powder produced by the above method is preferably washed with an acidic aqueous liquid having pH of not higher than 1.7.

DETAILED DESCRIPTION OF THE DRAWINGS

Figure 1:
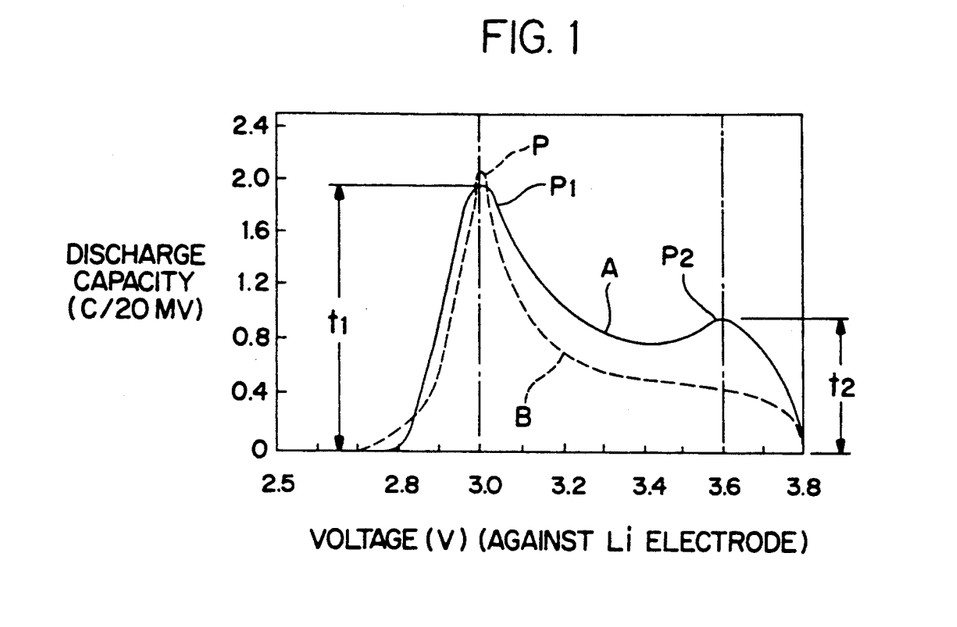
FIG. 1 shows a discharge capacity distribution curve against discharge voltage between 3.8 V and 2.5 V for the polyaniline positive electrode of the cell according to the present invention.

The positive electrode to be used in the cell of the present invention comprises the polyaniline which exhibits a discharge capacity distribution curve in the discharge voltage range between 3.8 V and 2.5 V as shown in FIG. 1 (solid curve A). The curve has a main peak $P_1$ around 3.0 V and a sub-peak $P_2$ around 3.6 V, and a ratio of a height $t_2$ of the sub-peak $P_2$ to a height $t_1$ of the main peak $P_1$ is at least 0.25.

The discharge voltage of 3.8 V is the maximum voltage at which the polyaniline cell works, and the discharge voltage of 2.5 V is the voltage of the positive electrode in the undoped state.

The conventional polyaniline synthesized, for example, by the electrolytic oxidative polymerization has only one peak P around 3.0 V as indicated by the broken curve B in FIG. 1, which peak P is inherent to the conventional polyaniline positive electrode, and a proportion of low voltage components around 3.0 V is very large. Therefore, on discharging the cell, the voltage sharply drops at an initial stage on the high voltage side and stabilizes when the voltage reaches the low voltage region around 3.0 V. Accordingly, the discharge voltage decreases.

On the contrary, with the positive electrode of the present invention, the discharge capacity curve (solid curve A in FIG. 1) has the sub-peak $P_2$ around 3.6 V in addition to the main peak $P_1$ which corresponds to the peak P, and the proportion of high voltage region is larger than in the conventional polyaniline positive electrode. Therefore, the voltage decreases slowly in the high voltage region on discharging, so that the discharge voltage can be high. In addition, the presence of the sub-peak $P_2$ increases the overall discharge capacity. As the result, the discharge life of the cell is greatly prolonged. However, the ratio of the height of sub-peak $P_2$ to that of the main peak $P_1$ is smaller than 0.25, a high energy density cannot be realized and the desired effects are not achieved.

The positive electrode of the present invention may be any one that has a discharge curve similar to the curve A in FIG. 1, namely a discharge curve having the main peak around 3.0 V and the sub-peak around 3.6 V. The discharge curve may have minor peaks at various voltages. The pattern of the discharge curve may slightly vary with the method of the production of polyaniline, a shape and a structure of the positive electrode, and other voltage elements. Such slight variation of the curve is within the scope of the present invention. Preferably, the position of the main peak $P_1$ is in the range of 3.0±0.1 V and that of the sub-peak $P_2$ is in the range of 3.6±0.1 V.

The polyaniline which exhibits the above discharge curve may be produced by any polymerization method. Preferably, the polyaniline is produced by chemical oxidative polymerization of aniline or its water-soluble salt with an oxidizing agent in a reaction medium containing a protonic acid to obtain the polyaniline powder having rod-like or spherical primary particle shape.

The preferable polyaniline powder can be produced by oxidative polymerizing aniline or its salt with ammonium bichromate [$(NH_4)_2Cr_2O_7$] or manganese dioxide ($MnO_2$) as the oxidizing agent in the presence of perchloric acid ($HClO_4$) or borofluoric acid ($HBF_4$) as the protonic acid.

The shape of the primary particles of the polyaniline powder is influenced by the kinds of agents used in the polymerization or the polymerization conditions. For example, with the combination of either one of the above specific oxidizing agents and perchloric acid, the shape of the primary particle is rod-like in many cases, while with other combination, the shape is often irregular spherical.

Since the rod-like polyaniline primary particles have better electrical conductivity than the spherical polyaniline primary particles, the cell comprising the positive electrode made of the former polyaniline has larger capacity than the cell comprising the positive electrode made of the latter polyaniline. Among the polymerization methods of the polyaniline which gives the above discharge curve, a method in which perchloric acid is used as the protonic acid and ammonium bichromate or manganese dioxide is used as the oxidizing agent is more preferable.

In case of the spherical polyaniline particles, it is possible to increase the capacity of the cell by optimizing the polymerization conditions or using a specific additive such as an electrical conducting aid.

When aniline is chemically oxidative polymerized with the combination of borofluoric acid as the protonic acid and manganese dioxide as the oxidizing agent with using manganese dioxide in an amount of 0.95 to 1.42 moles per one mole of aniline, primary particles of the resulting polyaniline powder are spherical. The positive electrode made of such polyaniline provides the polyaniline cell having a large capacity and a high energy density by using the above mentioned method.

Alternatively, the polyaniline powder having spherical primary particle shape can be used together with carbon powder to form the positive electrode. Thereby, the poor conductivity of the spherical polyaniline particles is compensated by the carbon powder which acts as the conducting aid. In addition, a mass of the spherical polyaniline particles has less crosslinked sites than the rod-like polyaniline particles, so that the properties of polyaniline is more effectively utilized in the cell and the cell has a larger capacity and a higher energy density.

For the production of the polyaniline powder having spherical primary particle shape which can be used together with the carbon powder, borofluoric acid and manganese dioxide are preferably used as the protonic acid and the oxidizing agent, respectively in the chemical oxidative polymerization of aniline. In particular, manganese dioxide and aniline are used in the above preferred molar ratio.

The polyaniline powder having the spherical primary particle shape and the carbon powder are used in a weight ratio of 95:5 to 85:15.

In the polymerization of aniline with using the borofluoric acid as the protonic acid, when manganese dioxide is used as the oxidizing agent, the temperature in the oxidative polymerization is suitably selected and the resulting polymer is washed in a specific manner, the polyaniline having the rod-like primary particle shape with good properties can be produced. Such production method will be explained in detail.

In this method, manganese dioxide is used in an amount of 0.75 to 1.5 moles per one mole of aniline. The concentration of aniline in the aqueous medium is at least 0.1 mole/l preferably at least 0.5 mole/l and in general from 0.2 to 1.0 mole/l. When the amount of manganese oxide or the concentration of aniline is outside the above range, the yield of polyaniline may be decreased.

The protonic acid to be used in this method is preferably borofluoric acid, although perchloric acid may be used. The protonic acid is used in an amount of at least 2.5 moles, preferably at least 3 moles, more preferably 3 to 4 moles per one mole of manganese dioxide. Outside this range, the polyaniline may have deteriorated conductivity.

Theoretically, the molar ratio of the protonic acid to manganese dioxide may be two according to the following reaction formulas if the emeraldin structure of polyaniline were assumed:

$$1.25Mn^{2+} + 2.5H_2O.$$

However, if pH of the reaction system is not kept low at the finalization of polymerization, the resulting polyaniline is in the undoped state so that it cannot provide the cell with good performances.

In the chemical oxidative polymerization of aniline, the polymerization temperature is important for obtaining the rod-like polyaniline particles. When the temperature is in the range from $-5°$ to $+10°$ C., preferably from $-3°$ to $+5°$ C., the rod-like polyaniline particles with good conductivity are obtained.

The polyaniline powder is purified by a conventional method. Usually, the polyaniline powder is washed with water to remove water-soluble impurities. However, if distilled water is used for washing, the acid dopant is removed and the polyaniline is dedoped. Therefore, it is preferable to wash the polyaniline powder with an acidic aqueous liquid to prevent dedoping. As the acidic aqueous liquid, an aqueous solution of the protonic acid is used. pH of the washing liquid is not larger than 1.7, preferably not larger than 1.0. At pH of larger than 1.7, the conductivity of the polyaniline is decreased.

In a preferred embodiment, the polyaniline particles have the rod-like shape with an average diameter of 0.01 to 1.0 μm and an average length of 0.1 to 10 μm. The material difference between the rod-like polyaniline particles of the present invention and fibrous polyaniline is dispersibility in a liquid. Since the fibrous polyaniline particles get tangled with each other, they cannot be dispersed even when ultrasonic wave is applied. On the contrary, the rod-like polyaniline particles are homogeneously dispersed in water or ethanol by the application of ultrasonic wave. As understood from the difference of dispersibility, the rod-like polyaniline particles have a far better mixing property with the electrical conducting aid than the fibrous polyaniline particles.

In the present invention, the positive electrode may be produced by charging a mixture of the polyaniline powder of the present invention and optionally carbon powder in a press mold and pressing the mixture in the mold.

The polyaniline cell of the present invention is a kind of a lithium type secondary cell, and metal lithium or the lithium alloy is used to form the negative electrode. The lithium alloy includes not only metallurgical alloys but also a laminate sheet of a lithium foil and a foil of other metal (e.g. aluminum, lead, indium, gallium, etc.).

As the non-aqueous electrolytic solution, preferred is a lithium ion-conductive electrolytic solution which comprises a lithium salt (e.g. $LiBF_4$, $LiClO_4$, $LiB(phenyl)_4$, $LiPF_6$, $LiAsF_6$, etc) dissolved in a non-aqueous solvent (e.g. propylene carbonate, γ-butyrolactone, dimethoxyethane, dioxolane, etc.). The acid radical in the lithium salt may be different from the protonic acid which is used in the production of polyaniline as the dopant.

Figure 2:
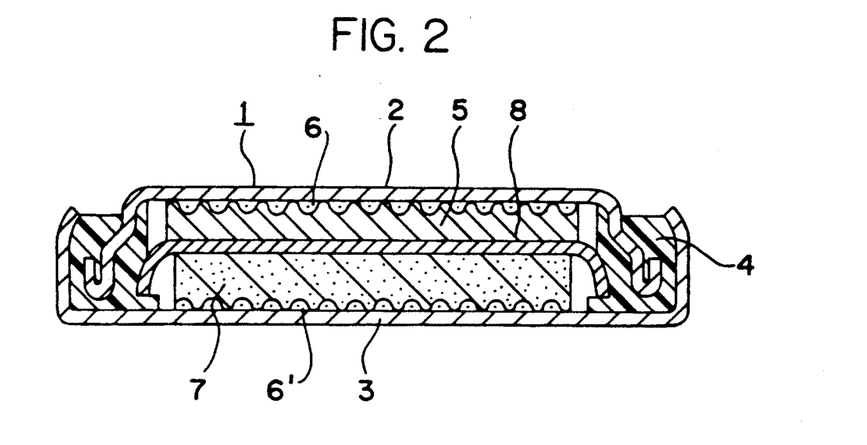
FIG. 2 is a cross section of a button shape cell according to the present invention.

FIG. 2 shows a cross section of a button shape cell according to the present invention. The cell comprises a cell casing 1 which is formed from a saucer-type negative electrode terminal plate 2 and a positive electrode terminal plate 3 which face each other and are made of, for example, stainless steel plates. The peripheries of the terminal plates 2 and 3 are fit and pressed together while interposing an annular gasket 4 between them to form a closed flat container. The gasket 4 is made of a resilient insulating material such as a synthetic rubber or resin.

The casing 1 contains a negative electrode 5 which is made of metal lithium or the lithium alloy and contacted to the negative electrode terminal plate 2 through a collector 6 such as a stainless steel net, a positive electrode 7 of the present invention which is contacted to the positive electrode terminal plate 3 through another collector 6 such as a stainless steel net, and a separator 8 made of a porous insulating material such as a polypropylene non-woven fabric with a porous polypropylene film, all of which are immersed in the non-aqueous organic electrolytic solution.

In addition to the button shape cell, the cell of the present invention may be a polyaniline/lithium type secondary cell having various structures and forms.

PREFERRED EMBODIMENTS OF THE INVENTION

The present invention will be explained in detail by following Examples, in which % is by weight unless otherwise indicated.

EXAMPLE 1

Aniline (14.0 g) and a 42% aqueous solution of $HBF_4$ (31.4 g) were dissolved in water (190 g) (Solution A). Separately, $(NH_4)_2Cr_2O_7$ (12.6 g) and a 42% aqueous solution of $HBF_4$ (78.4 g) were dissolved in water (200 g) (Solution B). To Solution A, Solution B was dropwise added over 2 hours at 2° C. while stirring. After finishing the addition of Solution B, the reaction mixture was further stirred for 3 hours at 2° C.

The reaction mixture was filtered through a glass filter to recover the resulting dark green precipitate, which was thoroughly washed with water and then acetone. The washed powder was dried under reduced pressure at 80° C. for 3 hours and then at 100° C. for 5 hours to obtain polyaniline powder. The electron microscopic photograph revealed that the powder particles were spherical and had an average primary particle size of 0.5 μm.

The obtained polyaniline powder (139 mg) (corresponding to 100 g of polyaniline in the undoped state) was press molded in a mold of 15 mm in inner diameter under pressure of 1.4 tons to form a positive electrode of 0.6 mm in thickness. A cell (A1) was set up in a beaker for evaluating the polyaniline positive electrode by using this polyaniline positive electrode, a lithium foil negative electrode of 0.8 mm in thickness and 15 mm in diameter, a separator made of a laminate of 0.375 mm in thickness made of porous polypropylene film and non-woven fabric of polypropylene and an organic electrolytic solution (7 ml) comprising a 1 mole/l solution of LiBF$_4$ in propylene carbonate.

Comparative Example 1

Through an aqueous solution of 1 mole/l of aniline and 2 mole/l of HBF$_4$, a voltage of 0.8 V was applied between a platinum plate (2 cm×2 cm) and a saturated calomel electrode to carry out constant voltage electrolytic polymerization to produce polyaniline. The produced polyaniline powder was collected, thoroughly washed with acetone and water successively and dried under reduced pressure at room temperature. The primary particles of polyaniline powder were fibrous, and their average particle size could not be measured.

In the same manner as in Example 1 but using the above polyaniline powder (130 g) (corresponding to 100 g of polyaniline in the dedoped state), a positive electrode was formed and a cell (B1) was set up.

Figure 3:
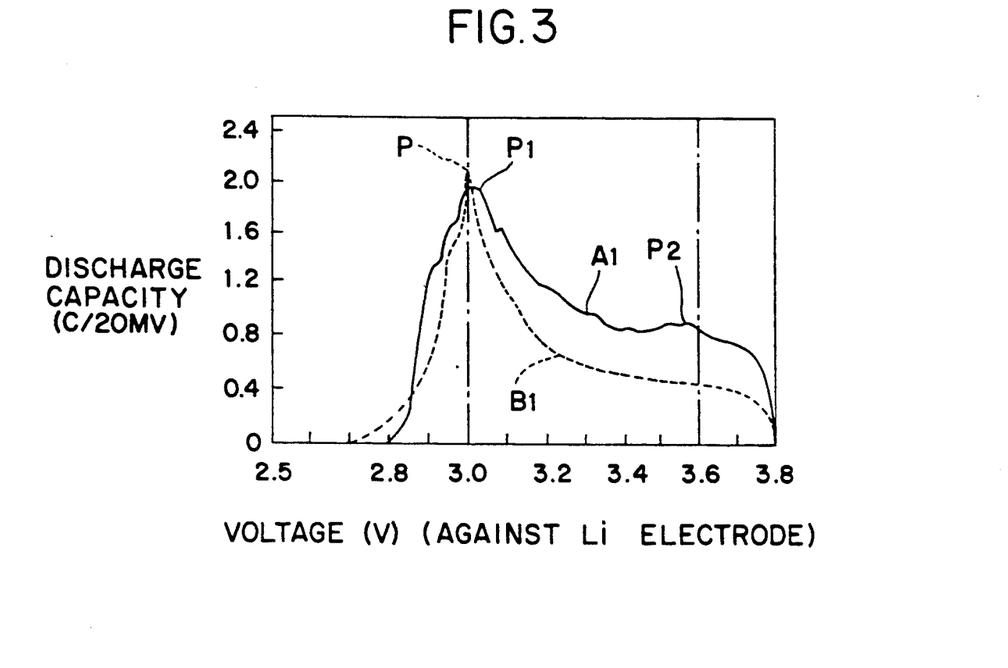
FIG. 3 shows discharge capacity distribution curves against discharge voltage of the cells A1 and B1.

Each of the cells A1 and B1 set up in Example 1 and Comparative Example 1, respectively, was charged to 3.8 V and connected to a discharging device comprising a constant voltage electric source and an ammeter. The voltage of the constant voltage electric source was adjusted at 3.78 V and a current passing through the device was measured with the ammeter. Then, the voltage of the electric source was stepwise decreased by 20 mV, namely to 3.76 V, 3.74 V, etc. down to 2.50 V, and the current was measured at each voltage. By integrating the measured current values, the discharged quantity of electricity in each 20 mV interval was calculated. The results are shown in FIG. 3. "A1" and "B1" in FIG. 3 correspond to the cells A1 and B1, respectively.

From FIG. 3, the cell A1 of the present invention had the main peak P$_1$ at 3.0 V and the sub-peak P$_2$ at 3.57 V in the discharge capacity distribution curve in the discharge voltage range between 3.8 V and 2.5 V, and the ratio of the height of sub-peak to that of main peak was 0.48. The cell B1 of Comparative Example had only the peak P at 3.0 V but no apparent peak around 3.6 V. The ratio of the height at 3.57 V to that of the peak P was about 0.20.

Figure 4:
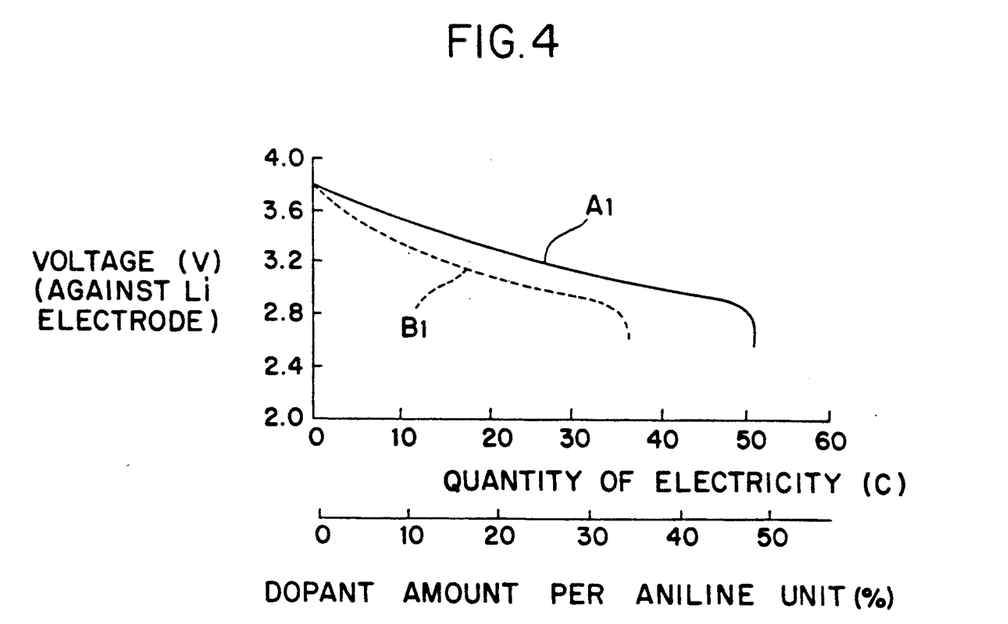
FIG. 4 shows equilibrium voltage curves of the cells A1 and B1.

The results of FIG. 3 were replotted in a graph of FIG. 4 in which the quantity of electricity was on the abscissa and the voltage was on the ordinate. Thereby, the equilibrium voltage curve was obtained. From FIG. 4, the capacity of the cell which is normalized by the undoped polyaniline is read. The cell of Example 1 had 14.2 mAh of the quantity of electricity per 100 mg of polyaniline, while that of Comparative Example 1 had 10 mAh of the quantity of electricity per 100 mg of polyaniline.

Figure 5:
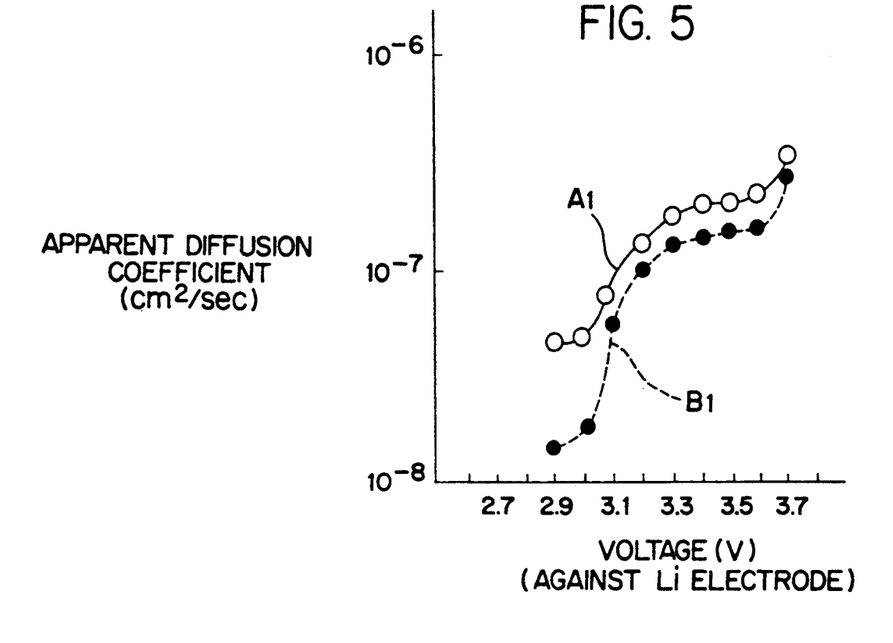
FIG. 5 shows relationships between apparent diffusion coefficients and discharge voltages of the cells A1 and B1.

From an attenuation curve of the discharged current in each voltage width of 20 mV, an apparent diffusion coefficient was calculated. The results are shown in FIG. 5. From these results, it is understood that the cell of Comparative Example 1 had a small diffusion coefficient and poor load characteristics, while the cell of Example 1 had the diffusion coefficient two or three times larger than that of the cell of Comparative Example 1 and better load characteristics.

EXAMPLE 2

Aniline (14.0 g) and a 60% aqueous solution of HClO$_4$ (25 g) were dissolved in water (190 g) (Solution A). Separately, (NH$_4$)$_2$Cr$_2$O$_7$ (12.6 g) and a 60% aqueous solution of HClO$_4$ (63 g) were dissolved in water (210 g) (Solution B). To Solution A, Solution B was dropwise added over 2 hours at 2° C. while stirring. After finishing the addition of Solution B, the reaction mixture was further stirred for 3 hours at 2° C.

The reaction mixture was filtered through a glass filter to recover the resulting dark green precipitate, which was thoroughly washed with water and then acetone. The washed powder was dried under reduced pressure at room temperature for 3 hours and then at 100° C. for 5 hours to obtain polyaniline powder. The electron microscopic photograph revealed that the powder particles were rod-like and had an average diameter of 0.1 μm and an average length of 0.5 μm.

In the same manner as in Example 1 but using the above polyaniline powder (50 g) (corresponding to 42 g of polyaniline in the undoped state), a positive electrode was formed.

Then, a cell (A2) was set up in the same manner as in Example 1 by using this polyaniline positive electrode, a negative electrode made of Li$_{0.56}$Al alloy having 50 mAh, the same separator as used in Example 1 and an organic electrolytic solution (130 μl) comprising a 2 mole/l solution of LiBF$_4$ in an equimolar mixture of dimethoxyethane and propylene carbonate.

EXAMPLE 3

Aniline (10 g), a 42% aqueous solution of HBF$_4$ (67.1 g corresponding 3 moles per mole of MnO$_2$) and distilled water (150 ml) were mixed in a 300 ml separable flask and cooled at 3° C. To the cooled mixture, MnO$_2$ (purity 90%) (10.3 g, an equimolar amount to aniline) was gradually added over about 1 hour. Due to the exothermic reaction, the temperature in the flask fluctuated between 3° C. and 15° C. After the addition of MnO$_2$, the reaction mixture was further stirred for 1 hour.

The resulting dark green suspension was filtered through a glass filter to recover the powdery product, which was washed with distilled water (250 ml) and acetone (250 ml×4). After repeating washing and filtering, the polyaniline powder was dried under reduced pressure at 100° C. for 5 hours to obtain polyaniline powder (9.2 g). The electron microscopic photograph revealed that the powder particles were rod-like and the primary particles had an average diameter of 0.15 μm and an average length of 0.5 μm.

In the same manner as in Example 2 but using the above polyaniline powder, a positive electrode was formed and a cell (A3) was set up.

Comparative Example 2

In the same manner as in Comparative Example 1 but using the same Solution A as prepared in Example 2, the polyaniline was prepared by the constant voltage electrolytic polymerization.

In the same manner as in Example 2 but using the above polyaniline powder, a positive electrode was formed and a cell (B2) was set up.

EXAMPLE 4

In the same manner as in Example 3 but using a 42% aqueous solution of HBF$_4$ (84.1 g), distilled water (138 ml) and MnO$_2$ (purity 90%) (13.0 g corresponding to 1.25 moles per mole of aniline), the polymerization was carried out to obtain polyaniline powder (12.5 g). The primary particles were spherical and had a diameter of 0.24 to 0.35 μm.

From a mixture of polyaniline powder (50 mg) and carbon powder having an average particle size of 44 μm (5 mg), a positive electrode was formed in the same manner as in Example 1. Then, in the same manner as in Example 2 but using this positive electrode and an organic electrolytic (130 μl) comprising a 2 mole/l solution of LiBF$_4$ solution in an equimolar mixture of dimethoxyethane and propylene carbonate, a polyaniline cell (A4) was set up.

EXAMPLE 5

In the same manner as in Example 4 but forming the positive electrode from the polyaniline powder (50 mg) alone, a cell (A5) was set up.

EXAMPLE 6

In the same manner as in Example 4 but using polyaniline powder which was produced by using a 60% aqueous solution of HClO$_4$ (67.3 g) in place of the 42% aqueous solution of HBF$_4$, a positive electrode was formed and a cell (A6) was set up.

EXAMPLE 7

In the same manner as in Example 6 but forming the positive electrode from the polyaniline powder (50 mg) alone, a cell (A7) was set up.

Comparative Example 3

In the same manner as in Example 4 but forming a positive electrode from a mixture of polyaniline powder (50 mg) which was prepared in the same manner as in Comparative Example 1 but applying the constant voltage at 1 mA and the same carbon powder as used in Example 4 (5 mg), a cell (B3) was set up.

Comparative Example 4

In the same manner as in Comparative Example 3 but forming a positive electrode from the polyaniline powder (50 mg) alone, a cell (B4) was set up.

With each of the cells A2–A7 and B2–B4 set up in Examples 2–7 and Comparative Examples 2–4, the discharge capacity distribution curve in the discharge voltage range between 3.8 V and 2.5 V was plotted. But, since the LiAl was used as the negative electrode, 0.38 V was added to the cell voltage to express the results in terms of the voltage against the lithium negative electrode.

All the polyaniline cells A2–A7 had the main peak around 3.0 V and the sub-peak around 3.6 V, and the ratio of the height of sub-peak to that of main peak was not smaller than 0.25. But, the cells B2–B4 had only the main peak around 3.0 V but no significant peak around 3.6 V, so that the ratio of the height at 3.6 V to that of the main peak was about 0.2.

Each of the cells A2–A7 and B2–B4 was charged so till the positive electrode had a potential 3.3 V larger than the negative electrode at a constant current of 500 μA and discharged to 2.0 V at a constant current of 300 μA. The above charge and discharge cycle was repeated and discharge capacity in the third cycle was measured. The results are shown in Table 1.

TABLE 1

| Cell No. | Discharge capacity (mAh) |
|---|---|
| A2 | 3.76 |
| A3 | 3.56 |
| B2 | 3.33 |
| A4 | 3.78 |

TABLE 1-continued

| Cell No. | Discharge capacity (mAh) |
|---|---|
| A6 | 3.54 |
| B3 | 3.33 |
| A5 | 3.61 |
| A7 | 3.50 |
| B4 | 3.28 |

Figure 6:
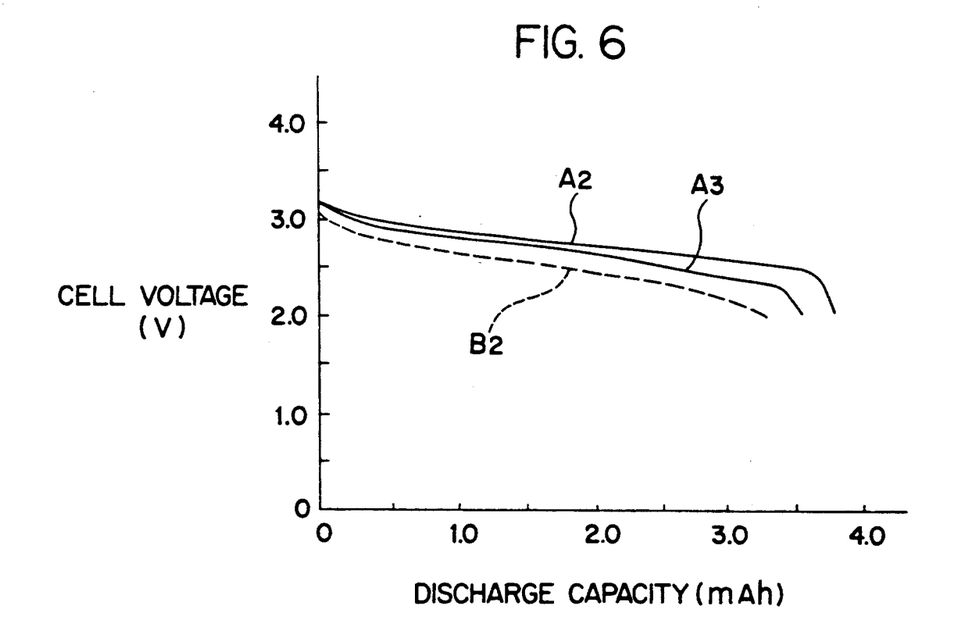
FIG. 6 shows discharge capacity distribution curves against discharge voltage of the cells A2, A3 and B2.
Figure 7:
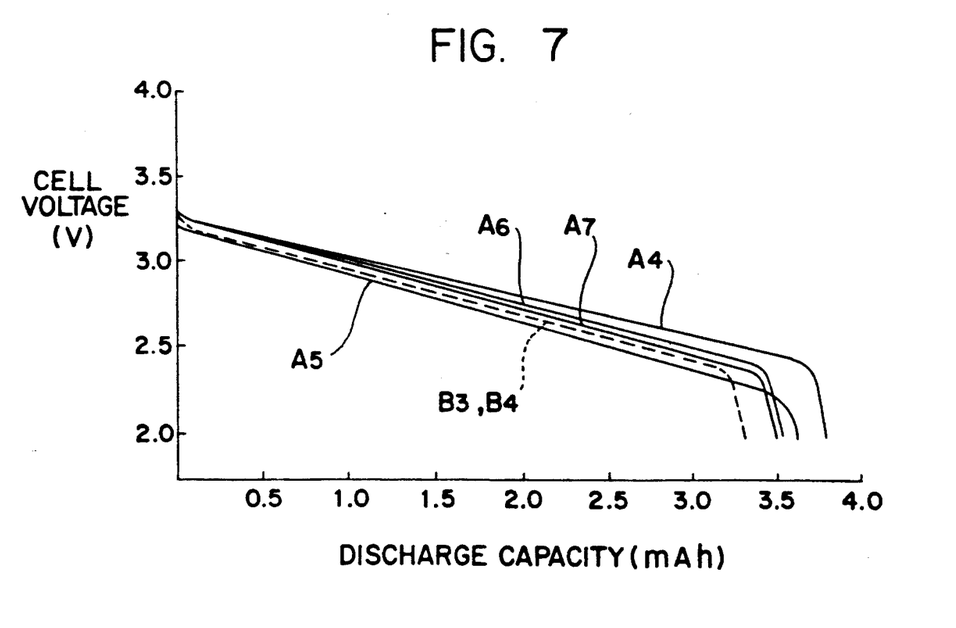
FIG. 7 shows discharge capacity distribution curves against discharge voltage of the cells A4 to A7, B3 and B4.

The discharge capacity curves for the cells A2, A3 and B2 in the third cycle were shown FIG. 6, and those for the cells A4–A7, B3 and B4 were shown in FIG. 7.

Figure 8:
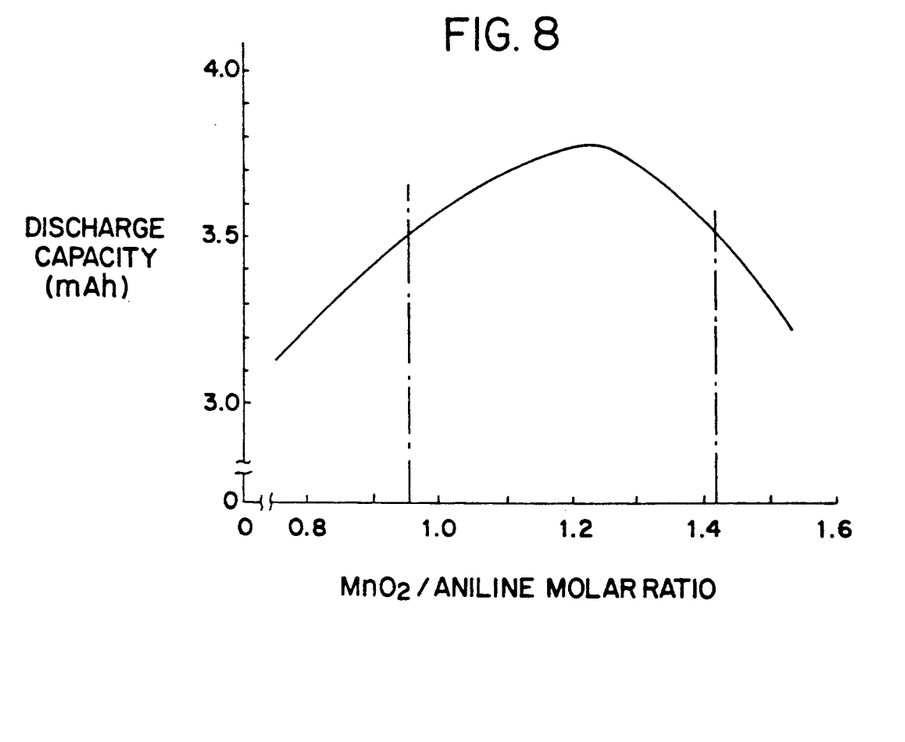
FIG. 8 shows a relationship between the discharge capacity and the molar ratio of manganese dioxide and aniline.

In the same manner as in Example 4, various cells were set up with using positive electrodes which were formed from polyaniline prepared by changing the molar ratio of MnO$_2$ to aniline, and subjected to the charge-discharge test as above. The discharge capacity in the third cycle was measured. The relationship between the MnO$_2$/aniline molar ratio and the discharge capacity is shown in FIG. 8.

From the results of Table 1, it is understood that the cells A2–A7 of the present invention had much larger capacity than the comparative cells B2–B4.

From FIG. 6, it is understood that when the positive electrode was made from the polyaniline powder the primary particles of which were rod-like and which was synthesized by chemical oxidative polymerization with using (NH$_4$)$_2$Cr$_2$O$_7$ or MnO$_2$ as the oxidizing agent and HClO$_4$ as the protonic acid, the cells A2 and A3 had the larger capacity, the higher energy density and the better load characteristics.

From Table 1 and FIG. 7, it is seen that the effect of addition of carbon powder to the polyaniline powder was very significant in the cell A4 in which the primary particles of polyaniline powder were spherical, while it was not so in the cells A6 and B3 in which the primary particles of polyaniline powder were rod-like and fibrous, respectively.

Further, from FIG. 8, it is understood that when the polyaniline powder the primary particle of which were spherical was used as the positive electrode material, the polyaniline powder which was prepared by using HBF$_4$ as the protonic acid and MnO$_2$ as the oxidizing agent and adjusting the molar ratio of MnO$_2$ to aniline in the range between 0.95 and 1.42 provided the cell having the high capacity.

EXAMPLE 8

Aniline (10 g), a 42% aqueous solution of HBF$_4$ (84 g corresponding 3 moles per mole of MnO$_2$) and distilled water (138 ml) were mixed in a 300 ml separable flask and cooled at 3° C. To the cooled mixture, MnO$_2$ (purity 90%) (13 g corresponding to 1.25 moles per mole of aniline) was gradually added over about 1 hour. After the addition of MnO$_2$, the reaction mixture was further stirred for 1 hour.

The resulting dark green suspension was filtered through a glass filter to recover the powdery product. pH of the filtrate was about 1.

The powdery product was stirred for about one hour in an aqueous solution of HBF$_4$ (250 ml) pH of which was adjusted at 1.7 and again filtered. pH of the filtrate was 1.8. Further, the powdery product was stirred in acetone (250 ml) and filtered. The washing with acetone and filtering was repeated six times. Finally filtered product was dried under reduced pressure at 80° C. for 5 hours to obtain polyaniline powder (12.3 g), the primary particles of which were rod-like and had an average diameter of 0.3 μm and an average length of 2.0 μm.

The polyaniline powder was pelletized in the form of a tablet having a diameter of 13 mm. The conductivity of this tablet measured by the four-probe method was 9.4 S/cm.

From the weight difference between before and after dedoping with aqueous ammonia, the doping level was calculated to be 42.2%.

Figure 9A:
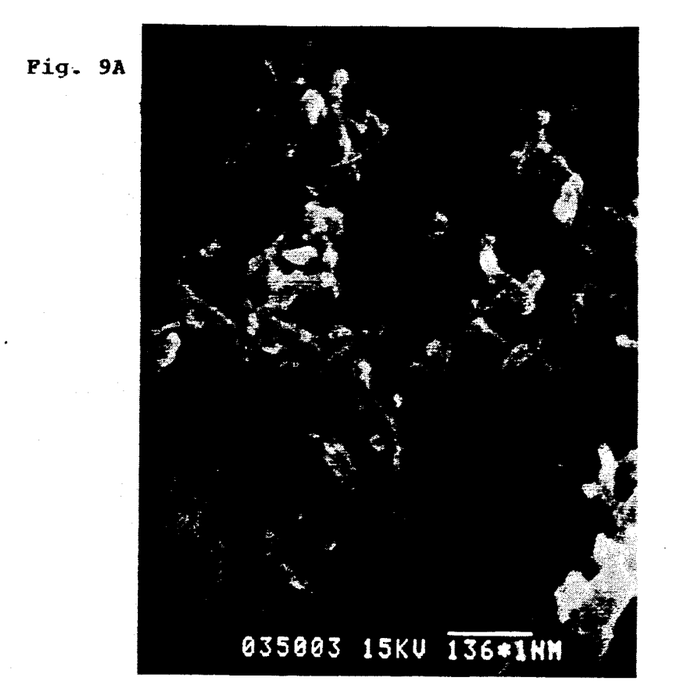
FIGS. 9A and 9B are electron microscopic photographs of the polyaniline powder prepared in Example 8.
Figure 9B:
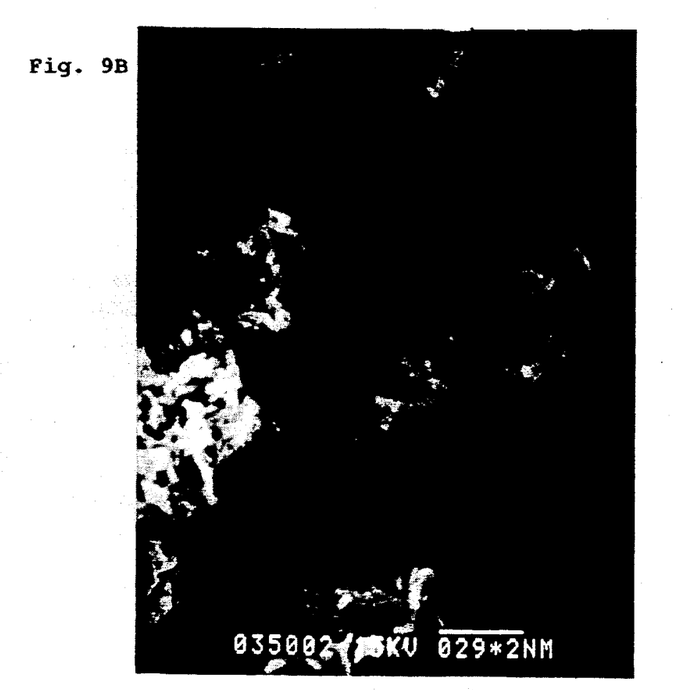

FIGS. 9A and 9B are electron microscopic photographs of the polyaniline powder at magnification of 10,000 times and 5,000 times, respectively.

EXAMPLE 9

In the same manner as in Example 8 but changing the polymerization temperature from 3° C. to −4.5° C., polyaniline powder (12.5 g) was produced, the primary particles of which were rod-like and had an average diameter of 0.2 μm and an average length of 1.5 μm.

The conductivity and the doping level were measured in the same manners as in Example 8. The conductivity was 3.8 S/cm and the doping level was 42.0%.

EXAMPLE 10

In the same manner as in Example 8 but changing the polymerization temperature from 3° C. to 16° C., polyaniline powder (11.8 g) was produced.

The conductivity and the doping level were measured in the same manners as in Example 8. The conductivity was 1.1 S/cm and the doping level was 39.4%.

Figure 10A:
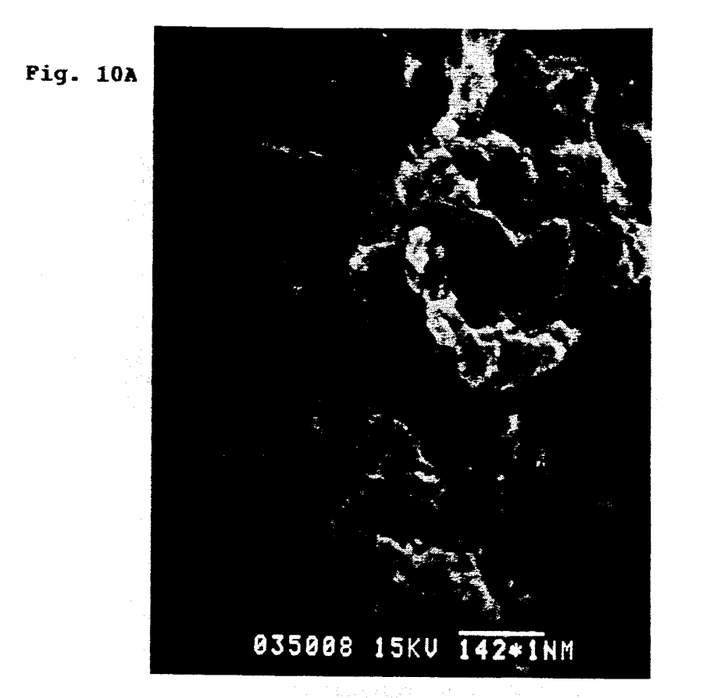
FIGS. 10A and 10B are electron microscopic photographs of the polyaniline powder prepared in Example 10.
Figure 10B:
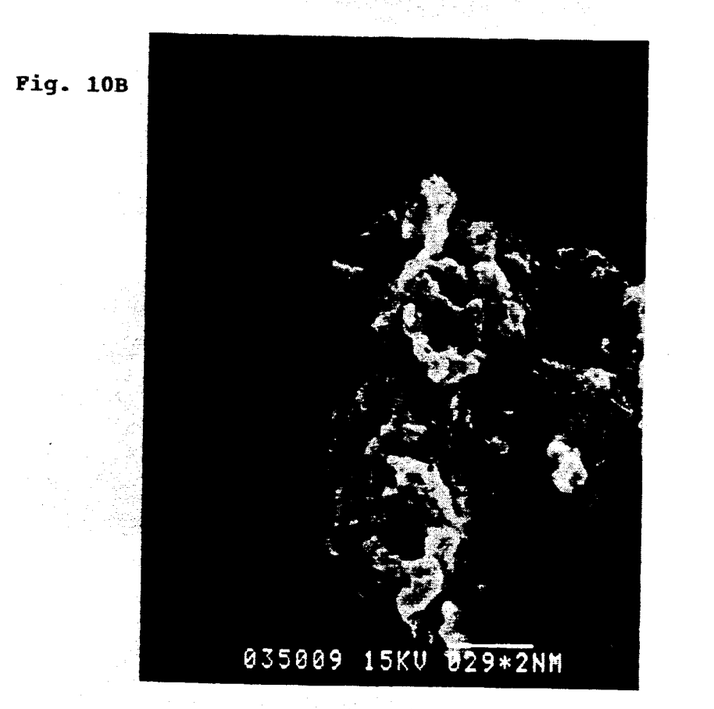

FIGS. 10A and 10B are electron microscopic photographs of the polyaniline powder at magnification of 10,000 times and 5,000 times, respectively. Apparent from these photographs, shapes of the primary particles of polyaniline powder were irregular.

Comparative Example 5

Aniline (9.31 g), a 42% aqueous solution of $HBF_4$ (41.8 g) and distilled water (making up to 100 ml) were poured in a 100 ml beaker. In the mixture, a pair of platinum plates (each 45 mm×45 mm) were immersed and electrolysis was carried out at a constant current of 300 mA at 25° C. After passing current up to 12,700 coulomb, the electrolysis was finished. Polyaniline deposited on the anode was peeled off, washed with an aqueous solution of $HBF_4$ (150 ml, pH=1.7) and filtered (twice). pH of the final filtrate was 1.7.

Thereafter, the polyaniline powder was treated with acetone in the same manner as in Example 8 to obtain polyaniline having a long fiber structure (5.97 g).

The conductivity and the doping level were measured in the same manners as in Example 8. The conductivity was 4.2 S/cm and the doping level was 41.6%.

Figure 11A:
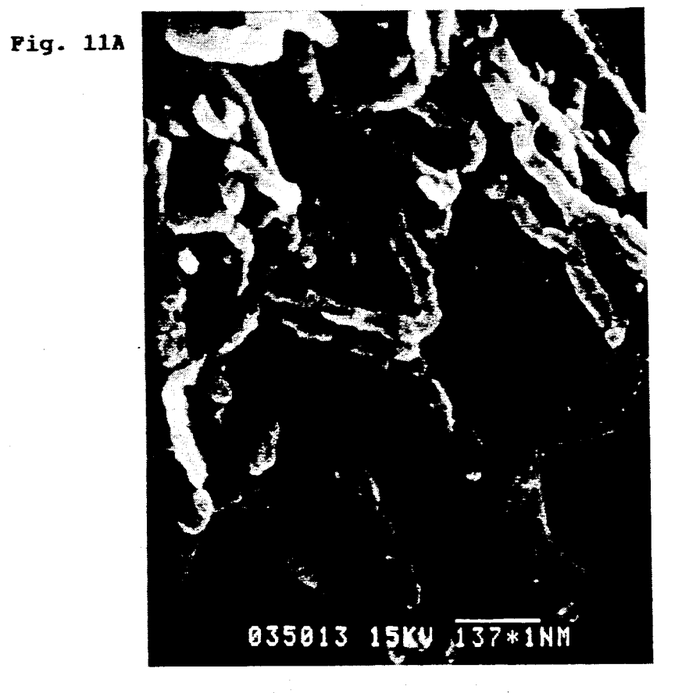
FIGS. 11A and 11B are electron microscopic photographs of the polyaniline powder prepared in Comparative Example 5.
Figure 11B:
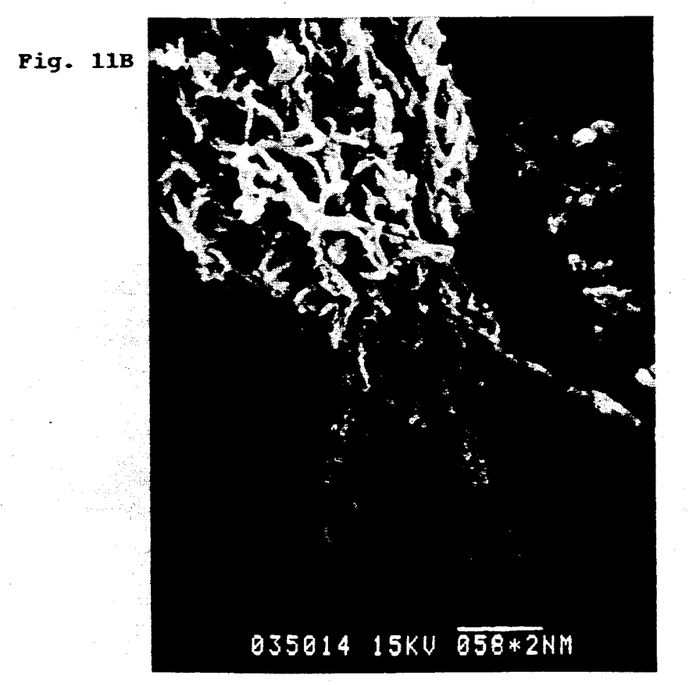

FIGS. 11A and 11B are electron microscopic photographs of the polyaniline powder at magnification of 10,000 times and 2,500 times, respectively.

EXAMPLE 11

1.5 Grams of the polyaniline powder prepared in Example 8 was weighed and stirred in an aqueous solution of $HBF_4$ having specific pH. An aqueous solution of sodium hydroxide was dropwise added till pH reached the predetermined value. To remove salts, filtration and changing of the liquid were repeated at least twice. Till pH was stabilized, these procedures were repeated for 10 days.

The treated polyaniline powder (30 mg) was press molded in a mold of 10 mm in inner diameter under pressure of 500 kg/cm² to produce a pellet of 0.4 mm in thickness, which was used as a positive electrode with using a platinum net as a collector. As a separator, a non-woven polypropylene fabric was used, and as a negative electrode, a lithium foil of 200 μm in thickness having a stainless steel net as a collector was used.

Then, the positive electrode, the separator and the negative electrode were placed between a pair of polypropylene porous plates and immersed in a 1 mole/l solution of $LiBF_4$ in propylene carbonate to set up a secondary cell for testing.

With the set up cell, a charge-discharge test was carried out at a charge-terminating voltage of 3.68 V, a discharge-terminating voltage of 2.38 V and a charge-discharge current of 1.0 mA to evaluate charge-discharge cycle characteristics.

Figure 12:
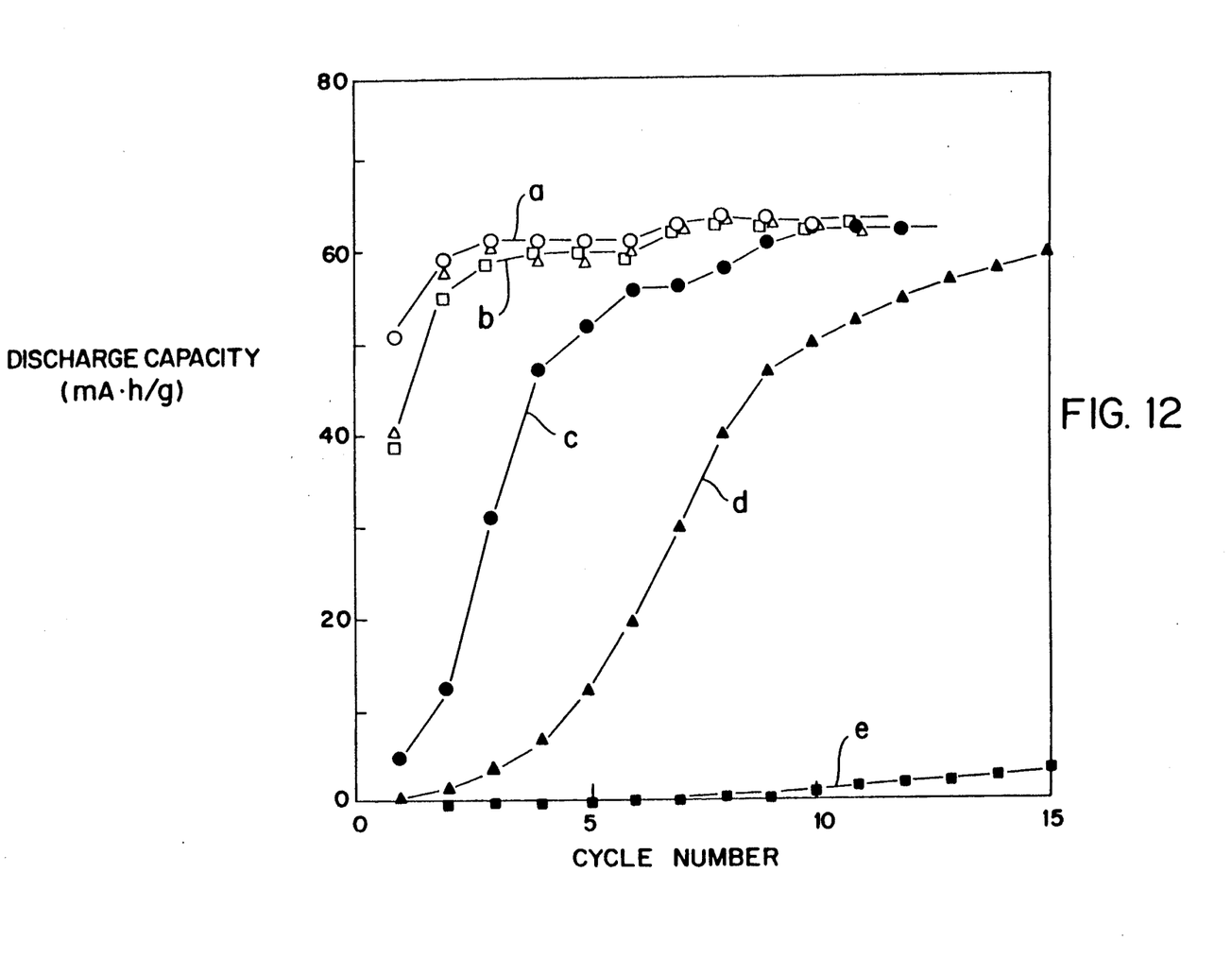
FIG. 12 shows relationships between the charge-discharge cycle number and the discharge capacity with using pH as the parameter and FIG. 13 shows a relationship between the cycle characteristics and the discharge capacity.

The results are shown in FIG. 12 as a function of pH during washing with water. In FIG. 12, the curve a represents the results at pH of less than 0 (zero), the curve b represents the results at pH of 0.8 (triangles) and 1.7 (squares), the curve c represents the results at pH of 2.42, the curve d represents the results at pH of 3.02, and the curve e represents the results at pH of 3.72.

Apparent from the results of FIG. 12, when equilibrated pH was 1.7 or less during washing with water (curves a and b), the initial charge-discharge cycle characteristic was excellent.

EXAMPLE 12

In the same manner as in Example 11 but using the polyaniline powder produced in Example 8, a cell was set up, and the charge-discharge test was carried out at a charge-terminating voltage of 3.9 V, a discharge-terminating voltage of 2.0 V and a charge-discharge current of 1.0 mA to evaluate charge-discharge cycle characteristics. The results are shown in FIG. 13.

Figure 13:
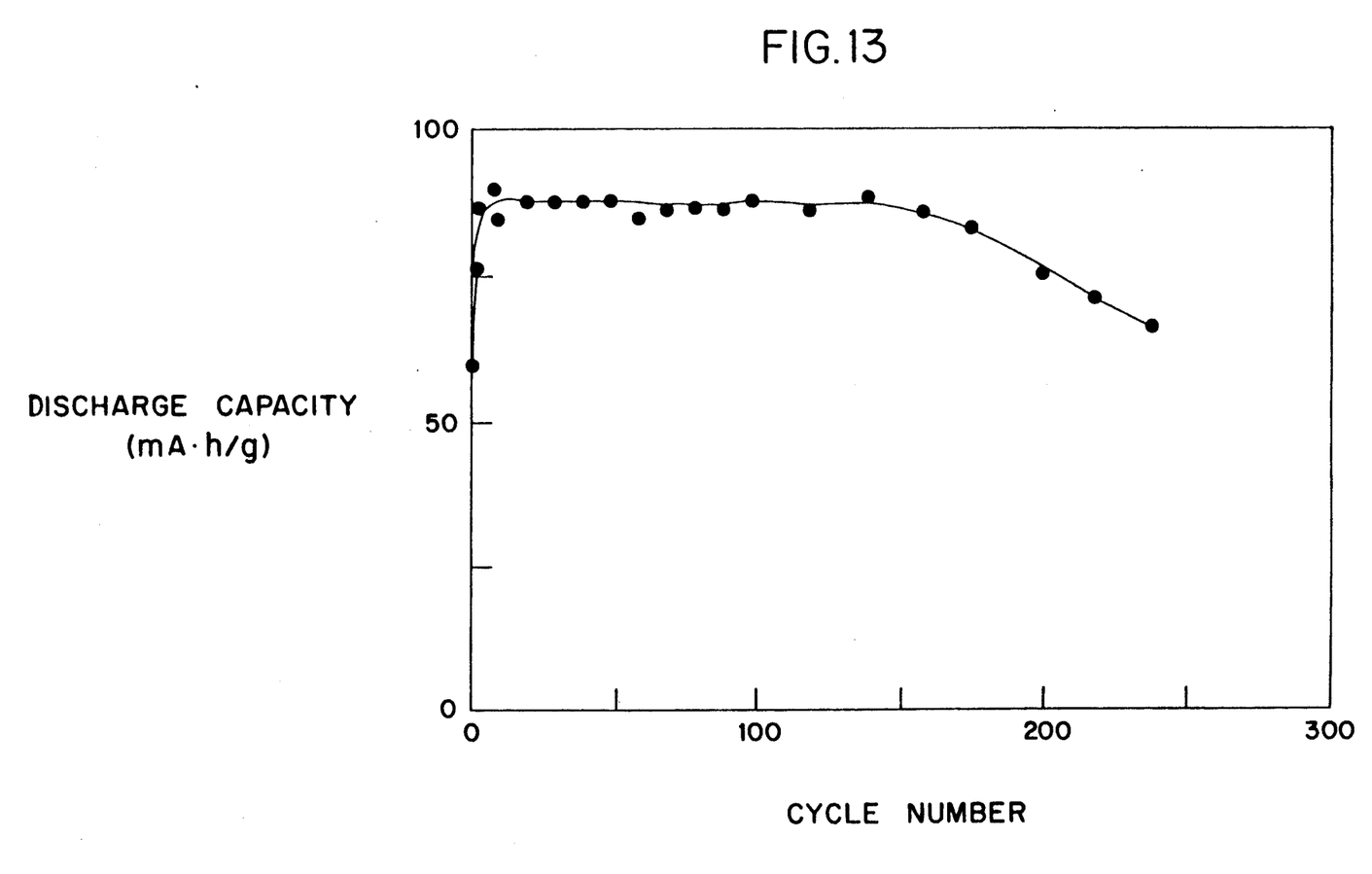

Apparent from FIG. 13, the cell had a very high discharge capacity of 88b mA.h/g from the first cycle and showed stable characteristics till 140 cycles. After 140 cycles, the cell was deteriorated. This may be because lithium of the negative electrode generated dendrite which might penetrated the non-woven fabric and the separator.

With the same cell, the charge-discharge test was carried out at a charge-terminating voltage of 3.68 V, a discharge-terminating voltage of 2.38 V and a charge-discharge current of 1.0 mA or 2.0 mA, and the discharge capacity was calculated at each current according to the following manners.

Discharge capacity

At 1.0 mA, the discharge capacity was an average value of ten cycles from the 31st cycle to the 40th cycle. At 1.0 mA, the discharge capacity was an average value of five cycles from the 41st to 45th cycle. The discharge capacity was calculated based on the weight of polyaniline including the dopant when the cell was set up.

The results are shown in Table 2.

EXAMPLE 13

In the same manner as in Example 11 but using the polyaniline powder prepared in Example 9, a secondary cell was set up, and the discharge capacity was measured in the same manner as in Example 12. The results are shown in Table 2.

EXAMPLE 14

In the same manner as in Example 11 but using the polyaniline powder prepared in Example 8 and carbon powder in an amount of 10% for forming the positive electrode, a secondary cell was set up, and the discharge capacity was measured in the same manner as in Example 12. The results are shown in Table 2.

Comparative Example 6

In the same manner as in Example 11 but using the polyaniline powder prepared in Comparative Example 5, a secondary cell was set up, and the discharge capacity was measured in the same manner as in Example 12. The results are shown in Table 2.

TABLE 2

| Example No. | Discharge capacity (mA · h/g) Discharge current at | |
|---|---|---|
| | 1.0 mA | 2.0 mA |
| 12 | 72 | 24 |
| 13 | 65 | 19 |
| 14 | 77 | — |
| Comp. 6 | 62 | 11 |

From the results of Table 2, it is understood that the secondary cells of Examples 12, 13 and 14 had the high capacity, good load characteristics and also the excellent charge-discharge cycle characteristics.

In addition, it was confirmed that the cells of Examples 12, 13 and 14 had the main peak around 3.0 V and the sub-peak around 3.6 V in the discharge capacity curves, and the ratio of the sub-peak to that of main peak was not smaller than 0.25.

What is claimed is:

1. A cell comprising a negative electrode made of metal lithium or a lithium alloy, a positive electrode which comprises polyaniline particles which are homogeneously dispersible in a liquid medium selected form the group consisting of water and ethanol by the application of ultrasonic wave and has a main peak around 3.0 V versus a lithium electrode and a sub-peak around 3.6 V versus a lithium electrode with a height ratio of the sub-peak to the main peak being not smaller than 0.25 in a discharge capacity distribution curve in the discharge voltage range between 3.8 V and 2.5 V versus a lithium electrode, and a non-aqueous organic electrolytic solution containing a lithium salt dissolved therein.

2. The cell according to claim 1, wherein said polyaniline consists of primary particles selected from the group consisting of rod-like or spherical and is prepared by oxidative polymerization of aniline or its water-soluble salt with an oxidizing agent in a reaction medium containing a protonic acid.

3. The cell according to claim 2, wherein said protonic acid is selected from the group consisting of perchloric acid and borofluoric acid and said oxidizing agent is selected from ammonium bichromate and maganese dioxide. particles of said polyaniline is rod-like.

4. The cell according to claim 3, wherein said protonic acid is perchloric acid and the shape of primary particles of said polyaniline is rod-like.

5. The cell according to claim 3, wherein said protonic acid is borofluoric acid, said oxidizing agent is manganese dioxide, a molar ratio of manganese dioxide to aniline is 0.95 to 1.42, and the shape of primary particles of said polyaniline is rod-like.

6. The cell according to claim 1, wherein said positive electrode comprises a mixture of polyaniline powder having an average primary particle size of not larger than 0.5 μm and carbon powder.

7. The cell according to claim 3, wherein said oxidizing agent is manganese dioxide and the shape of primary particles of said polyaniline is rod-like.

* * * * *